United States Patent
Park et al.

(10) Patent No.: US 9,355,543 B2
(45) Date of Patent: May 31, 2016

(54) APPARATUS AND METHOD FOR PREVENTING ACCIDENT IN PORTABLE TERMINAL

(71) Applicant: Samsung Electronics Co., Ltd., Suwon-si, Gyeonggi-do (KR)

(72) Inventors: Jeongmin Park, Suwon-si (KR); Jaewoong Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 52 days.

(21) Appl. No.: 14/208,641

(22) Filed: Mar. 13, 2014

(65) Prior Publication Data

US 2014/0300466 A1  Oct. 9, 2014

(30) Foreign Application Priority Data

Apr. 4, 2013  (KR) ........................ 10-2013-0036653

(51) Int. Cl.
  *G08B 1/08*  (2006.01)
  *G08B 19/00*  (2006.01)
  *H04M 1/725*  (2006.01)
  *G08B 23/00*  (2006.01)
  *H04N 7/18*  (2006.01)
  *H04N 11/04*  (2006.01)

(52) U.S. Cl.
  CPC ........... *G08B 19/00* (2013.01); *H04M 1/72569* (2013.01); *H04M 2250/12* (2013.01); *H04M 2250/52* (2013.01)

(58) Field of Classification Search
  CPC .... G08B 27/005; G08B 7/066; G08B 25/016; G08B 21/02; G08B 25/009

USPC .......... 340/539.1, 539.11, 501; 348/158, 159; 455/404.2
See application file for complete search history.

(56) References Cited

U.S. PATENT DOCUMENTS

| 7,308,246 B2* | 12/2007 | Yamazaki | G08B 25/08 379/56.3 |
|---|---|---|---|
| 2006/0284979 A1* | 12/2006 | Clarkson | A61B 5/061 348/143 |
| 2012/0262582 A1* | 10/2012 | Kimchi | H04M 1/72569 348/159 |
| 2013/0057696 A1* | 3/2013 | Felt | H04W 4/22 348/158 |
| 2013/0154824 A1* | 6/2013 | Cai | G08B 21/02 340/539.11 |
| 2013/0183924 A1* | 7/2013 | Saigh | H04W 4/025 455/404.2 |
| 2014/0266669 A1* | 9/2014 | Fadell | G05B 19/042 340/501 |
| 2015/0102936 A1* | 4/2015 | Vartiainen | G08B 7/066 340/691.6 |

FOREIGN PATENT DOCUMENTS

KR  10-2006-0078364 A  7/2006

\* cited by examiner

*Primary Examiner* — Jack K Wang
(74) *Attorney, Agent, or Firm* — Jefferson IP Law, LLP

(57) ABSTRACT

An apparatus and a method for preventing an accident in a portable terminal are provided. The method includes obtaining environmental situation information from a sensor, detecting a dangerous object by analyzing the environmental situation information, extracting at least one of a notice service mapped to the dangerous object and a control service mapped to the dangerous object, and executing the at least one of the extracted notice service and the extracted control service.

19 Claims, 10 Drawing Sheets

FIG. 4
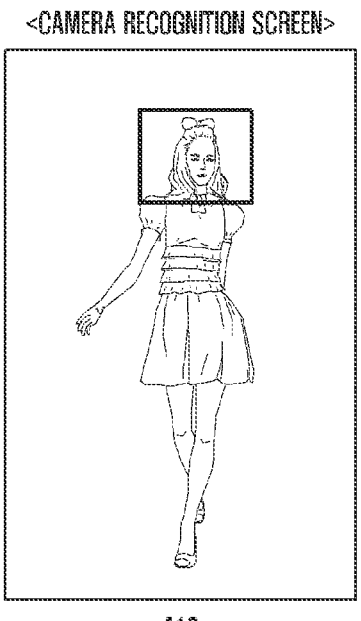
<410>
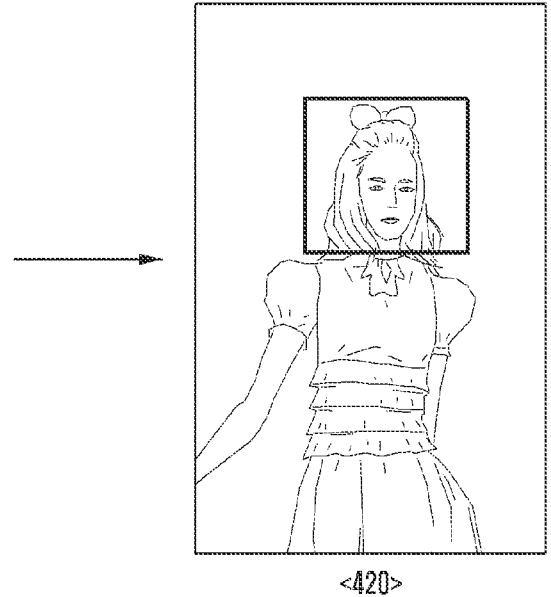
<420>
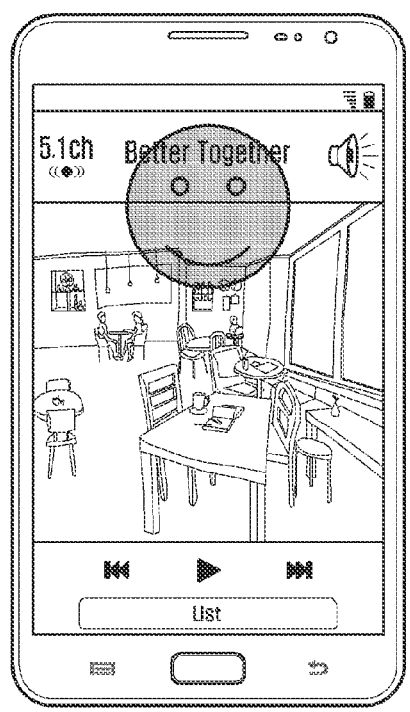
<430>
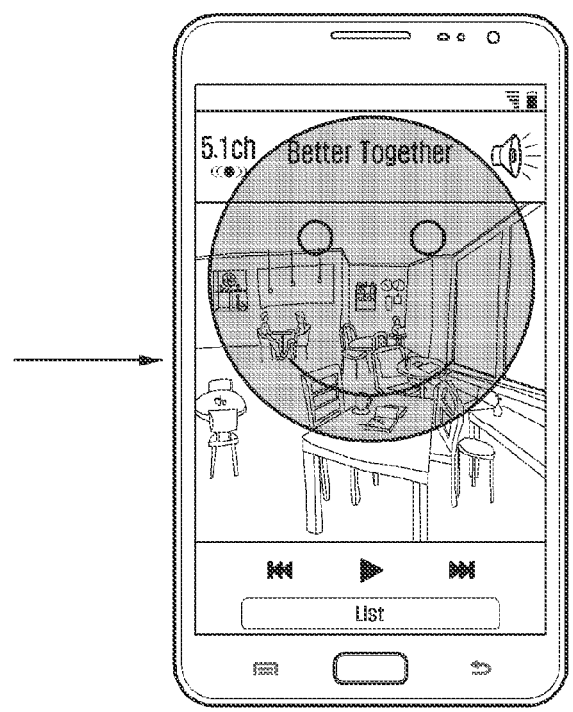
<440>

FIG. 8
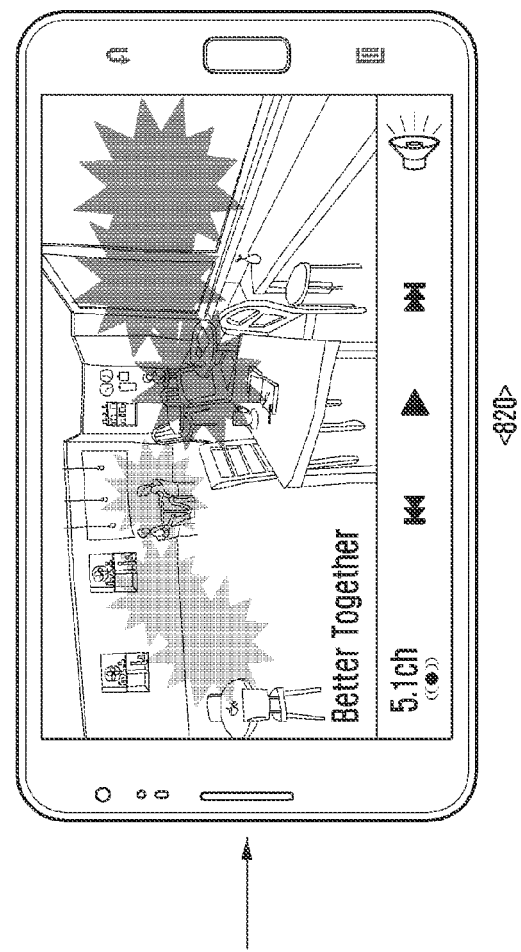
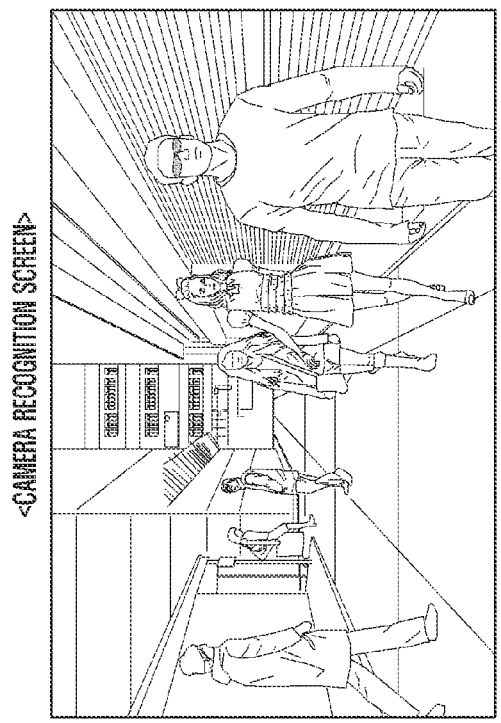

FIG. 10
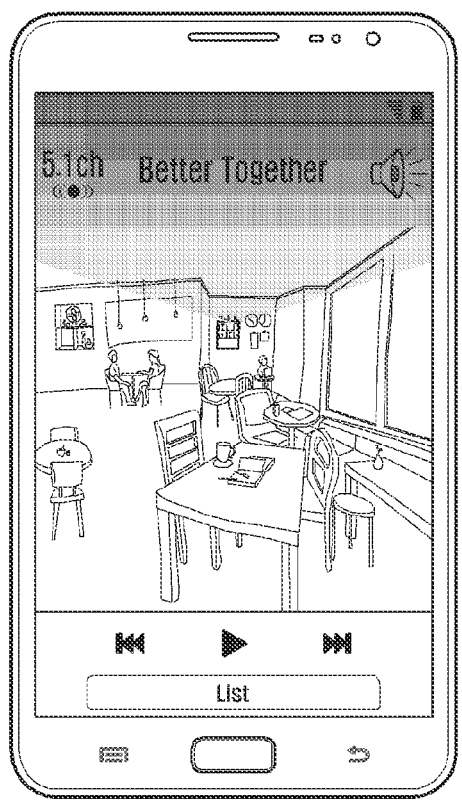
<1010>
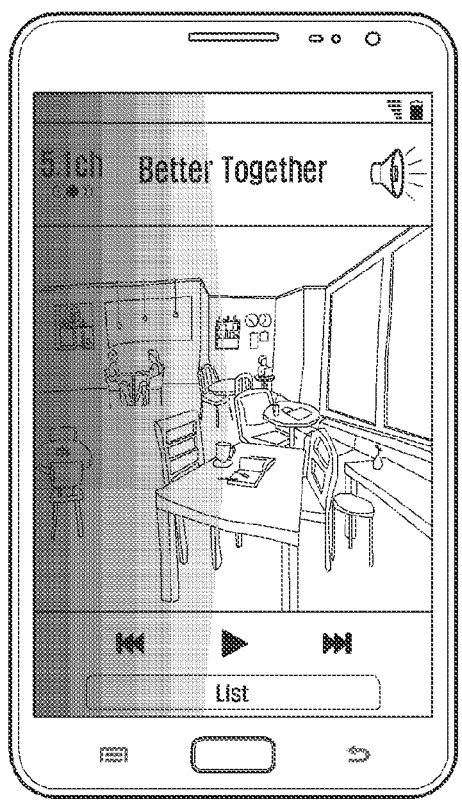
<1020>

APPARATUS AND METHOD FOR PREVENTING ACCIDENT IN PORTABLE TERMINAL

CROSS-REFERENCE TO RELATED APPLICATION(S)

This application claims the benefit under 35 U.S.C. §119 (a) of a Korean patent application filed on Apr. 4, 2013 in the Korean Intellectual Property Office and assigned Serial number 10-2013-0036653, the entire disclosure of which is hereby incorporated by reference.

TECHNICAL FIELD

The present disclosure relates to an apparatus and a method for preventing an accident in a portable terminal More particularly, the present disclosure relates to an apparatus and a method for preventing a collision by identifying and/or determining a dangerous object through an analysis of an environmental situation obtained from a sensor and intuitively notifying to a user using a portable terminal.

BACKGROUND

According to the recent development in digital technology, various portable terminals for processing communication and personal information, such as a mobile communication terminal, a Personal Digital Assistant (PDA), an electronic notebook, a smart phone, and a tablet Personal Computer (PC), are being launched.

The portable terminal can support various application functions of a voice communication, a Short Message Service (SMS), a Multimedia Message Service (MMS), video communication, an electronic notebook, a camera, email exchange, broadcasting play, moving image play, an internet, electronic commerce, music play, schedule management, a Social Networking Service (SNS), a messenger, a dictionary, and a game console.

However, problems may be generated because a number of persons using portable terminals while driving or walking is increasing.

Due to the popularization of portable terminals, persons using the portable terminal while driving or walking are frequently seen regardless of the time and place. If a person concentrates on a mobile phone while driving or walking, the person may cause an accident and/or become a target of a crime because the person may not easily recognize an environmental situation. Namely, if a portable terminal user transmits a message, listens to music, surfs the internet while walking or driving, or concentrates on the portable terminal in any similar and/or non-suitable manner, a user may not recognize dangers existing in a surrounding environment. It is common that users concentrating on a portable terminal jay walk or unconsciously step ahead while waiting in the traffic sign. The users must pay attention to the change of a traffic sign and vehicles approaching from the right and left, however the users frequently neglect paying attention to the traffic sign and vehicles.

Further, sexual molesters may commit a crime against a woman paying attention to a portable terminal in a subway or street, and thereby measures for solving the problems are urgently needed.

The related art discloses a technology of inducing a user to concentrate on a front direction by simultaneously providing two screens through a screen merging technology for an operating application, for example, SMS, and a camera application.

Namely, the related art overlaps a camera image on a background of the operating application. However, if the user concentrates on the operating application, the user may not recognize a dangerous state even though the background shows an environmental situation. Therefore, this method may not be effective for warning the user against the danger. This is because the user may not correctly recognize an environmental situation due to a blindness, lack of concentration, and/or lack of attention, even though the user's eyes are directed to the front.

For example, according to the statistics of traffic accidents, a front-observing rate drops to 50% if a driver watches a Digital Multimedia Broadcast (DMB), which is much lower than a front-observing rate 72% corresponding to a driver's blood alcohol concentration 0.1%, which may be relevant to the revocation of a driving license. It is obvious that the front-observing rate may drops if the user glances at the environmental situation in a background. Therefore, this method may not be a practical solution for preventing an accident even though the terminal device provides an image of environmental situation in the background.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and a method for preventing an accident in a portable terminal by identifying and/or determining a dangerous object and/or a dangerous state through an analysis of environmental situation information obtained from a sensor and notifying a user using the mobile terminal.

In accordance with an aspect of the present disclosure, a method for preventing an accident in a portable terminal is provided. The method includes obtaining environmental situation information from a sensor, detecting a dangerous object by analyzing the environmental situation information, extracting at least one of a notice service mapped to the dangerous object and a control service mapped on the dangerous object, and executing the at least one of the extracted notice service and the extracted control service.

In accordance with another aspect of the present disclosure, an apparatus for preventing an accident in a portable terminal is provided. The apparatus includes a sensor unit configured to obtain environmental situation information of the portable terminal, a control unit configured to detect a dangerous object by analyzing the environmental situation information obtained from the sensor unit, to extract at least one of a notice service mapped to the dangerous object and a control service mapped to the dangerous object, and to execute the at least one of the extracted notice service and the extracted control service, and a storage unit configured to store environmental situation information for comparing with the at least one of the extracted notice service and the extracted control service.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 4, 5, 6, 7, 8, 9, and 10 are screen examples illustrating a service providing method for preventing an accident while using a portable terminal according to an embodiment of the present disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The portable terminal according to various embodiments of the present disclosure may be applied to any suitable information and/or communication equipment and multimedia equipment, such as a tablet Personal Computer (PC), a mobile communication terminal, a mobile phone, a personal information terminal, a Personal Digital Assistant (PDA), a smart phone, an International Mobile Telecommunication 2000 (IMT-2000) terminal, a Code Division Multiple Access (CDMA) terminal, a Wideband Code Division Multiple Access (WCDMA) terminal, a Global System for Mobile communication (GSM) terminal, a General Packet Radio Service (GPRS) terminal, an Enhanced Data GSM Environment (EDGE) terminal, a Universal Mobile Telecommunication Service (UMTS) terminal, a digital broadcasting terminal, an Automated Teller Machine (ATM), or any other similar and/or suitable electronic device.

Figure 1:
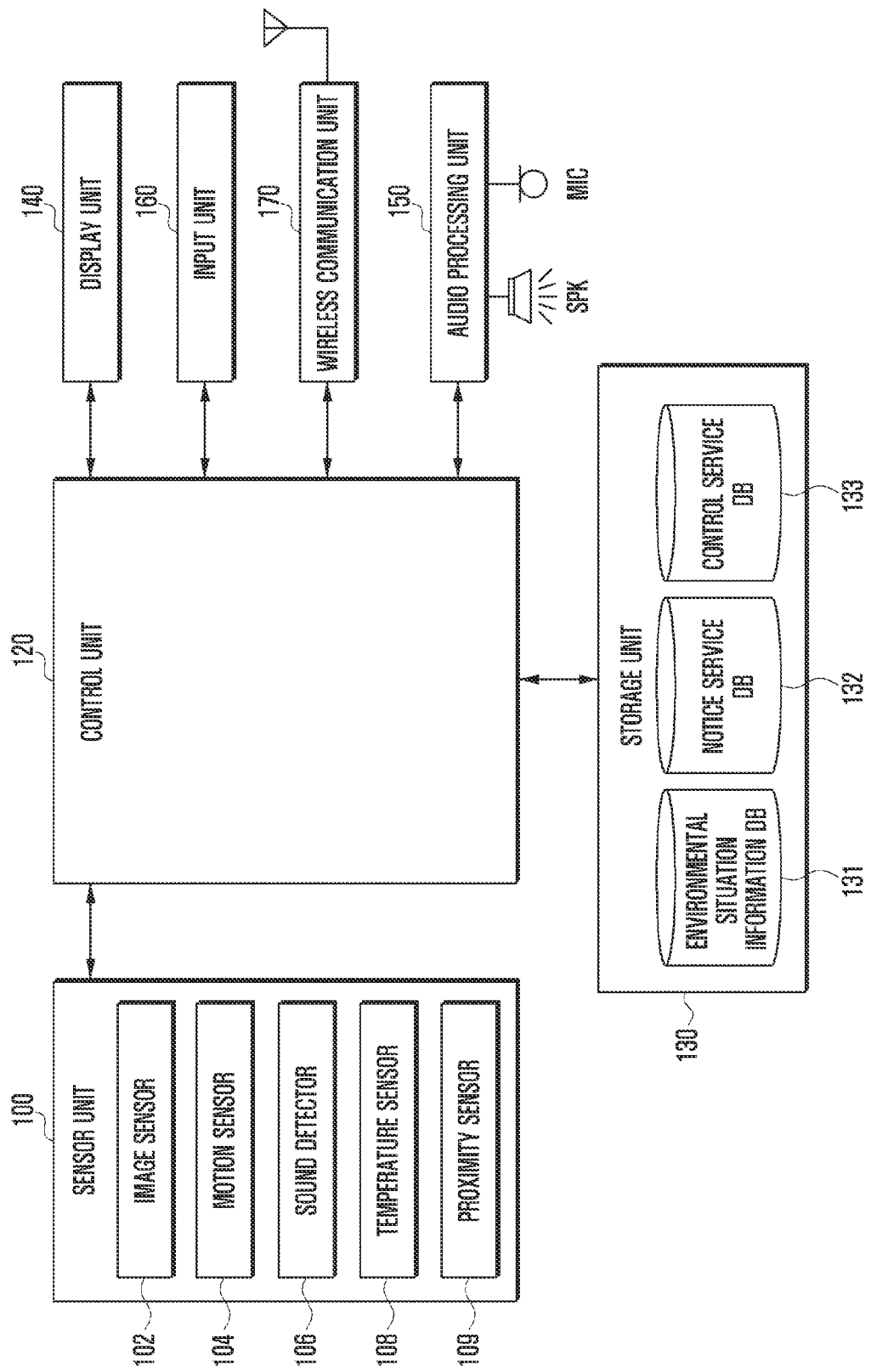
FIG. 1 is a block diagram illustrating a configuration of a portable terminal for preventing an accident while using the portable terminal according to an embodiment of the present disclosure.

FIG. 1 is a block diagram illustrating a configuration of a portable terminal for preventing an accident while using the portable terminal according to an embodiment of the present disclosure.

Referring to FIG. 1, the portable terminal, according to an embodiment of the present disclosure, is configured with a sensor unit 100, a control unit 120, a storage unit 130, a display unit 140, an audio processing unit 150, an input unit 160, and a wireless communication unit 170.

The sensor unit 100 may be automatically driven by a specific application of the portable terminal according to a designer's decision and/or a user's selection. The sensor unit 100 is integrated in the portable terminal, and performs a role of obtaining environmental situation information of the portable terminal.

The sensor unit 100 may be configured with an image sensor 102, a motion sensor 104, a sound detector 106, a temperature sensor 108, a proximity sensor 109, and an environmental sensor (not shown), and may further include any sensor which can obtain environmental situation information of the portable terminal, such as a motion sensor, an acceleration sensor, a gyroscopic sensor, a geomagnetic sensor, an inertial sensor, a tilt sensor, an infrared sensor, and any other similar and/or suitable sensor.

The control unit 120 drives the sensor unit 100 in an execution state of an application or a waiting state, and/or according to a user input. The control unit 120 obtains environmental situation information using the sensor unit 100, and detects a dangerous object and/or dangerous state by analyzing the environmental situation information. The control unit 120 extracts a control service or notice service mapped on the dangerous object and/or dangerous state if the detected dangerous object and/or dangerous state is determined, wherein the dangerous object and/or dangerous state may inflict an injury on a user, and the control unit 120 executes the extracted control service or notice service.

Here, the application may include an embedded application, a 3rd party application, or any other similar and/or suitable application that may be included in the portable terminal. The embedded application is an application launched in the portable terminal, such as a browser, email, and instant messenger. The 3rd party application may include various applications which may be installed in the portable terminal by downloading from an online market.

The control unit 120 may obtain the environmental situation information from an image obtained from the image sensor 102, sound, such as a voice, obtained from the sound detector 106, movement obtained from the motion sensor 104, a temperature value obtained from the temperature sensor 108, an approaching object detected by the proximity sensor 109, a pollutant, which may be a noxious substance having a noxiousness, detected by an environmental sensor, and any other similar and/or suitable type of information and/or data obtained from any suitable and/or similar sensor, sensing device, and/or sensing unit.

Further, the control unit 120 may detect a person and/or object by analyzing the image obtained from the image sensor 102, and may detect a dangerous object by determining an approach through a distance to the person or object.

Further, the control unit 120 may detect a dangerous object by analyzing a sound obtained from the sound detector 106, such as a horn from vehicles including a car, a bicycle, a train, a subway train, and an ambulance, and sounds such as a fire emergency bell, a burglar alarm, a shouting sound, and an animal's howling sound. The control unit 120 may detect dangerous states such as an impact, a collision, and a drop of the portable terminal, by analyzing a movement of the portable terminal obtained from the motion sensor 104. The control unit 120 may detect a dangerous state of the surroundings of the portable terminal by analyzing a temperature value obtained from the temperature sensor 108. The control unit 120 may detect an approach of a person and/or object if the person and/or object are detected by the proximity sensor. The control unit 120 may determine that the environmental situation is harmful to a person if a pollutant concentration detected by the environmental sensor is higher than a predetermined value.

The control unit 120 may determine levels corresponding to the dangerous object and/or dangerous state, and may differentiate a level of notifying and alarming to a user according to the levels of dangerous object and/or dangerous state.

Namely, the control unit 120 may give an urgent alarm to a user, or may switch off the portable terminal, if the level of danger is determined to be very high. Alternatively, the control unit 120 may output a notice displayed on a screen, such as a moving images or graphics, an alarm sound, a vibration, and switching on a light, if the level of danger is relatively low, or in other words, if the user may easily recognize a danger.

For example, if an approach of a person and/or object is determined to be closer than a predetermined level by analyzing an image obtained from the image sensor 102, the control unit 120 may determine that the person and/or object may inflict an injury to a user due to a higher possibility of collision. If at least one of a movement, a collision, and an impact generated in the portable terminal is determined to be higher than a predetermined level using the motion sensor 104, the control unit 120 may determine that a user may get injured. If a temperature value obtained from the temperature sensor 108 is higher than a predetermined value, the control unit 120 may determine that a dangerous object casing a fire or explosion is generated and a user can get injured. If an approach of object is determined to be closer than a predetermined distance using the proximity sensor 109, the control unit 120 may determine that a dangerous object having a higher possibility of collision with the user is generated. If a pollutant concentration measured by the environment sensor is higher than a predetermined value, the control unit 120 determines that a user should escape from the environmental situation.

The control service may be at least one of an execution of stopping an application operating in the portable terminal, an execution of switching off a screen, and an execution of outputting an alarm notice sound, and may further utilize any method of awakening and/or alerting a user by attracting attention at the same time of stopping or terminating an operation of the portable terminal.

The notice service is at least one of an execution of outputting metaphors including at least one of a text, a symbol, and an icon for notifying a dangerous state in a screen, an image of dangerous object, a silhouette of dangerous object, an image determined according to the dangerous object, an execution of reducing a brightness of a screen, and an execution of moving image contents to notify a danger. Further any method of notifying a dangerous state in an operating state of the portable terminal may be applicable. The metaphor may be output to an application execution screen and/or a waiting screen, and may be controlled according to settings of a size and a transparency of the metaphor.

The storage unit 130 is an auxiliary memory device of the control unit 120, and may include a disk, a Random Access Memory (RAM), a Read Only Memory (ROM), a flash memory, or any other similar and/or suitable hardware element that stores data and/or information. The storage unit 130 may store data generated by the portable terminal under the control of the control unit 120, and/or data received from an external device, for example, a server, desktop PC, and tablet PC, through the wireless communication unit 170 or an external device interface unit (not shown).

The storage unit 130 stores a booting program and an Operating System (OS) for the operation of portable terminal.

The storage unit 130 stores an embedded application and a 3rd party application. The 3rd party application may be freely installed and controlled. If the portable terminal is switched on, a booting program is firstly loaded in a main memory, for example, a RAM, of the control unit 120. The booting program loads an OS in the main memory for the operation of portable terminal. The OS executes applications by loading the applications in the main memory.

In particular, the storage unit 130, according to an embodiment of the present disclosure, may include an environmental situation information database 131, a notice service database 132, and a control service database 133. The environmental situation information database may include predictable environmental situation information stored in a manufacturing process of the portable terminal, and data of dangerous states and dangerous objects.

The display unit 140 may include a touch panel (not shown) and a display panel (not shown). The touch panel may be installed in the display panel. The touch panel generates an analog signal, for example, a touch event, responding to a user's gesture, and transmits a digital signal to the control unit 120 by converting the digital signal from the analog signal.

In particular, the display unit 140, according to an embodiment of the present disclosure, may output an application execution screen, a waiting screen, and a booting screen, and may display a notice service extracted by the control unit 120. Alternatively, the display unit 140 may stop or terminate the application execution screen, a home screen, a waiting screen, a locking screen, and an environment setting screen, and/or may display a screen covered by the notice service.

The input unit 160 may receive a command input by a user to execute a notice service and/or a control service, and a command for driving at least one sensor.

The audio processing unit 150 performs input and output functions of an audio signal to support functions of voice recognition, voice recording, digital recording, and voice communication by using a combination of a Speaker (SPK) and a Microphone (MIC).

The audio processing unit 150 receives a digital audio signal from the control unit 120, converts the received digital audio signal to an analog audio signal, and amplifies and then outputs the analog audio signal to the speaker SPK. The audio processing unit 150 outputs an analog audio signal received from the MIC, and outputs the analog audio signal to the control unit 120 after converting it to a digital audio signal.

In particular, the audio processing unit 150, according to the present disclosure, may stop outputting sound contents to a speaker, earphone, or headset, according to a notice service and/or control service executed by the control unit 120. Further, the audio processing unit 150 may store an alarm sound and/or a specific sound detected by the sound detector 106, and outputs such to the speaker, earphone, and headset.

The wireless communication unit 170 performs a wireless communication function with a base station and/or other devices. The mobile communication unit 170 may be a Radio Frequency (RF) communication unit configured with a transmitter for up-converting the frequency of a signal to be transmitted and amplifying an electric power, and a receiver for low-noise amplifying and down-converting the frequency of a received signal. Further, the wireless communication unit 170 may include an encoder and a decoder. The encoder outputs a signal to the transmitter by encoding the signal, and the decoder decodes a signal received from the receiver. The encoder and decoder may correspond to any communication system, and may be one of a Long Term Evolution (LTE) system, a WCDMA system, a GSM system, a WIFI system, and a Wireless Broadband (WIBRO) system. The wireless communication unit 170 performs a wireless communication function between a terminal device and a network by connecting to a public radio communication network and/or an internet network. Further, the wireless communication unit 170 may include an LTE communication unit (not shown) for communicating with an LTE base station and a WIFI communication unit (not shown).

In particular, the wireless communication unit 170, according to an embodiment of the present disclosure, may automatically transmit information of a dangerous state and/or a dangerous object determined by the control unit 120 to a contact number. The contact number may include at least one of telephone numbers determined and/or selected by a designer and/or user of the portable terminal, such as telephone numbers of a family and friend, and telephone numbers of a fire station, police station, and police box.

Figure 2:
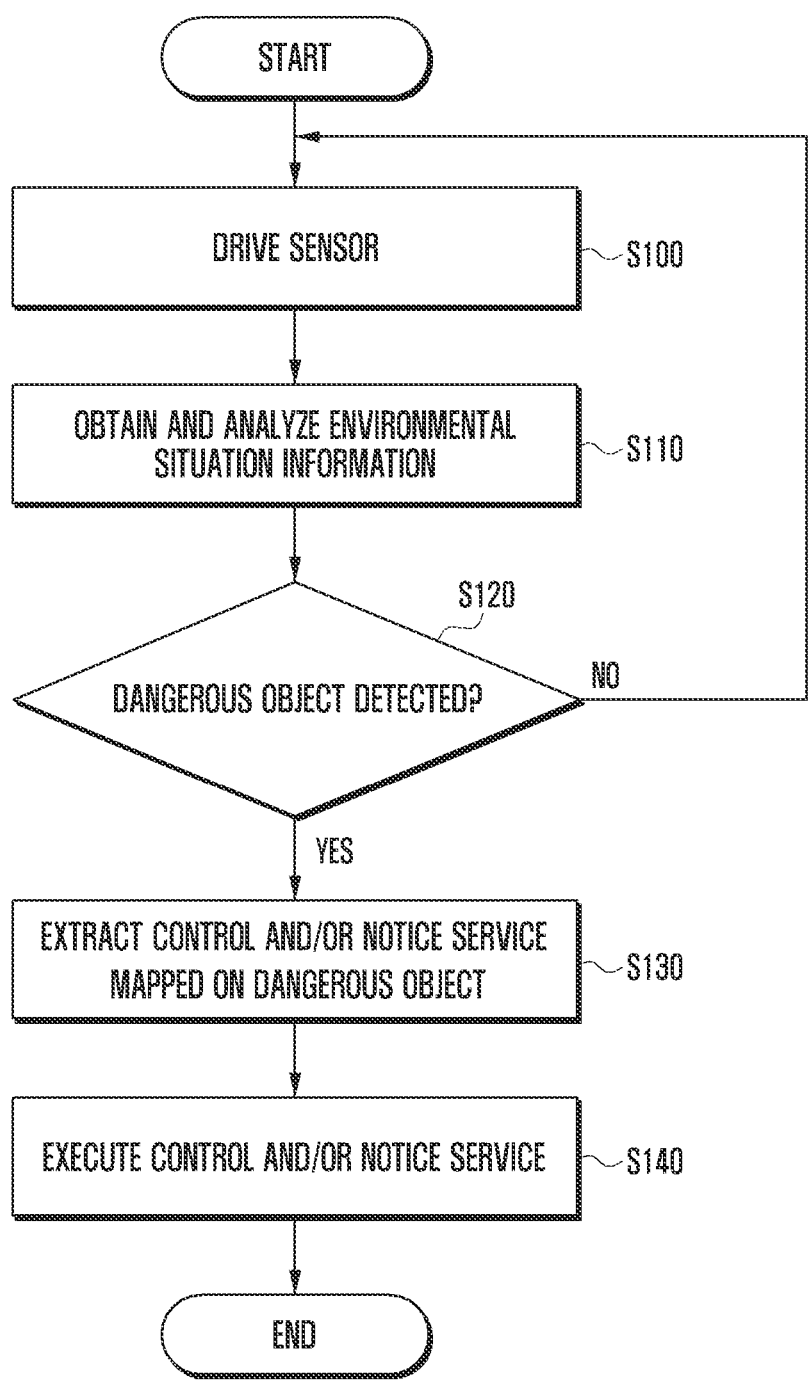
FIG. 2 is a flow chart illustrating a procedure of preventing an accident while using a portable terminal according to an embodiment of the present disclosure.

FIG. 2 is a flow chart illustrating a procedure of preventing an accident while using a portable terminal according to an embodiment of the present disclosure.

Referring to FIG. 2, the control unit 120 drives at least one sensor configured in the portable terminal at operation 100.

The portable terminal, which includes the control unit 120, may drive the sensor in at least one of an application execution state, a waiting state, and a booting state. The application may include an embedded application and a 3rd party application. The embedded application may be an application launched in the portable terminal, such as a browser, email, and instant messenger. The 3rd party application may include various applications which may be installed in the portable terminal by downloading from an online market.

Further, the sensor may be automatically driven according to a specific application determined by a designer, and/or driven according to a user's selection. The sensor is integrated in the portable terminal, and performs a role of obtaining environmental situation information of the portable terminal, and/or obtains any other similar and/or suitable sensed information, as described above.

For example, the sensor may be at least one of the image sensor 102, the motion sensor 104, a voice detection sensor such as the sound detector 106, the temperature sensor 108, the proximity sensor 109, a speed detection sensor, and an environmental sensor, and may further include any sensor which may obtain environmental situation information of the portable terminal. The motion sensor 104 may be configured with at least one of an acceleration sensor, a gyroscopic sensor, a geomagnetic sensor, an inertial sensor, a tilt sensor, and an infrared sensor.

The control unit 120 obtains and analyzes the environmental situation information at operation 110.

Namely, the control unit 120 obtains the environmental situation information using at least one sensor, such as an image obtained from the image sensor 102, a sound obtained from a voice detection obtained from a voice detection sensor and/or the sound detector 106, movement obtained from the motion sensor 104, a temperature value obtained from the temperature sensor 108, an approach of an object detected by the proximity sensor 109, and a pollutant detected by an environmental sensor.

The control unit 120 analyzes the environmental situation information obtained at operation 110, and, at operation 120, determines whether a dangerous object and/or dangerous state is detected according to the environmental situation information.

For example, the control unit 120 detects a person and/or object by analyzing an image obtained from an image sensor, determines an approach of the person and/or object, and detects a dangerous object and/or dangerous state.

The control unit 120 may detect a dangerous object by analyzing a sound obtained from the voice detection sensor. For example, the control unit 120 may detect a dangerous object and/or dangerous state by analyzing a sound obtained from the sound detector 106, such as a horn from vehicles including a car, a bicycle, a train, a subway train, and an ambulance, and sounds such as a fire emergency bell, a burglar alarm, a shouting sound, and an animal's howling sound.

The control unit 120 may detect dangerous states such as an impact, a collision, and a drop of the portable terminal by analyzing a movement of the portable terminal obtained from the motion sensor 104. The control unit 120 may detect a dangerous state of the surroundings of the portable terminal by analyzing a temperature value obtained from the temperature sensor 108. The control unit 120 may detect an approach of a person and/or an object if the person and/or object are detected by the proximity sensor 109. The control unit 120 may determine that the environmental situation is harmful to a person if a pollutant concentration detected by an environmental sensor is higher than a value.

The control unit 120, at operation 130, extracts a control service and/or notice service mapped on the dangerous object and/or dangerous state that has been detected.

The control service may be at least one of an execution of stopping an application operating in the portable terminal, an execution of switching off a screen, and an execution of outputting an alarm notice sound, and may further utilize any method of awakening a user by attracting attention at the same time of stopping or terminating a previous state of the portable terminal.

The notice service is at least one of an execution of outputting metaphors including at least one of a text, a symbol, and an icon for notifying a dangerous state in a screen, an image of dangerous object, a silhouette of dangerous object, an image determined according to the dangerous object, an execution of reducing the brightness of the screen, and an execution of displaying moving image contents to notify a danger. Further any method of notifying a dangerous state in an operating state of the portable terminal may be applicable. The metaphor may be output to an application execution screen and/or a waiting screen of a display unit, and a size and a transparency of the screen may be controlled according to the settings of the portable terminal.

The control unit 120 executes the extracted control service and/or notice service at operation 140.

Namely, the control unit 120 may stop an application operating in the portable terminal, may switch off a screen, and/or may notify a danger situation to a user by generating an alarm notice sound.

The control unit may inform a dangerous situation to a user by outputting metaphors including at least one of a text, the symbol, and the icon for notifying a dangerous state in a screen, the image of dangerous object, the silhouette of dangerous object, the image determined according to the dangerous object, and/or by reducing the brightness of the screen.

Further, any method of notifying a dangerous state in an operating state of the portable terminal may be applicable. The metaphor may be output to an application execution screen or to a waiting screen of a display unit, and the size and transparency of the screen may be controlled according to the settings of the portable terminal. The metaphor may be output to an application execution screen or waiting screen, and may be controlled by settings of the size and transparency of the metaphor.

Figure 3:
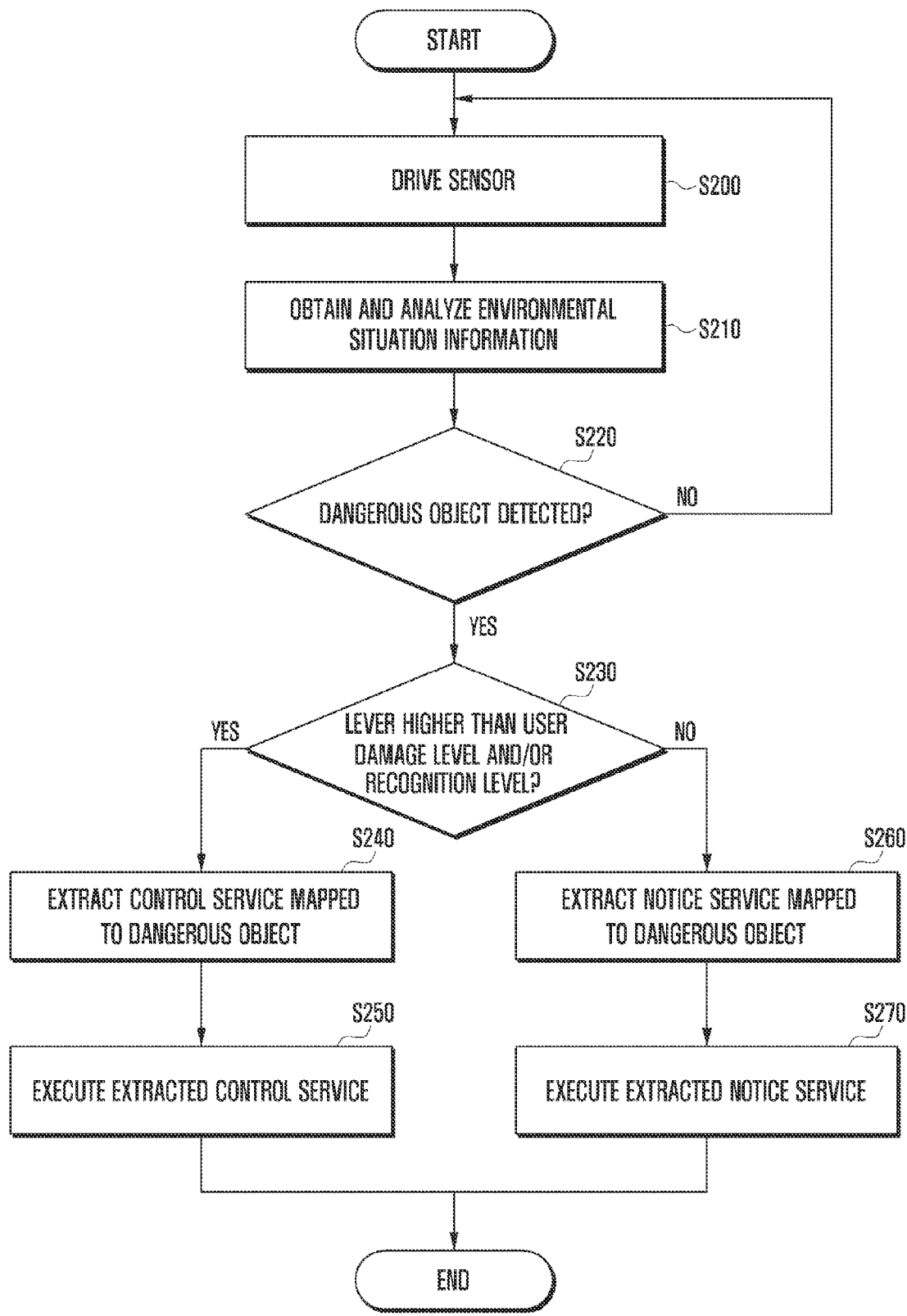
FIG. 3 is a flow chart illustrating a procedure of preventing an accident while using a portable terminal according to an embodiment of the present disclosure.

FIG. 3 is a flow chart illustrating a procedure of preventing an accident while using a portable terminal according to another embodiment of the present disclosure.

Referring to FIG. 3, the control unit 120 drives at least one sensor configured in the portable terminal at operation 200.

The portable terminal may drive the sensor in at least one of an application execution state and a waiting state. The application may include an embedded application and a 3rd party application. The embedded application may be an application launched in the portable terminal, such as a browser, email, and instant messenger. The 3rd party application includes various applications which may be installed in the portable terminal by downloading from an online market.

Further, the sensor may be automatically driven according to a specific application determined by a designer, and/or driven according to a user's selection. The sensor is integrated in the portable terminal, and performs a role of obtaining environmental situation information of the portable terminal.

For example, the sensor may be at least one of the image sensor 102, the motion sensor 104, a voice detection sensor such as the sound detector 106, the temperature sensor 108, the proximity sensor 109, a speed detection sensor, and an environmental sensor, and may further include any sensor which may obtain environmental situation information of the portable terminal. The motion sensor 104 may be configured with at least one of an acceleration sensor, a gyroscopic sensor, a geomagnetic sensor, an inertial sensor, a tilt sensor, and an infrared sensor.

The control unit 120 obtains and analyzes the environmental situation information at operation 210.

Namely, the control unit 120 obtains the environmental situation information using at least one sensor, such as an image obtained from the image sensor 102, a sound obtained from a voice detection obtained from a voice detection sensor and/or the sound detector 104, movement obtained from the motion sensor 104, a temperature value obtained from the temperature sensor 108, an approach of an object detected by the proximity sensor 109, and a pollutant detected by an environmental sensor.

The control unit 120 analyzes the environmental situation information obtained at operation 210, and, at operation 220, determines whether a dangerous object is detected according to the environmental situation information.

For example, the control unit 120 detects a person and/or object by analyzing an image obtained from the image sensor 102, determines an approach of the person and/or object, and detects a dangerous object and/or dangerous state.

The control unit 120 may detect a dangerous object by analyzing a sound obtained from the voice detection sensor and/or the sound detector 106. For example, the control unit 120 may detect a dangerous object and/or dangerous state by analyzing a sound obtained from the sound detector 106, such as a horn from vehicles including a car, a bicycle, a train, a subway train, and an ambulance, and sounds, such as a fire emergency bell, a burglar alarm, a shouting sound, and an animal's howling sound.

The control unit 120 may detect dangerous states, such as an impact, collision, and drop of the portable terminal by analyzing a movement of the portable terminal obtained from the motion sensor 104. The control unit 120 may detect a dangerous state of the surroundings, or in other words, a surrounding environment, of the portable terminal by analyzing a temperature value obtained from the temperature sensor 108. The control unit 120 may detect an approach of a person and/or object if the person and/or object is detected by the proximity sensor 109. The control unit 120 may determine that the environmental situation is harmful to a person if a pollutant concentration detected by an environmental sensor is higher than a predetermined value.

The control unit 120 determines whether the detected dangerous object and/or dangerous state can inflict an injury to a user and/or is a level recognizable by the user, or in other words, the control unit 120 determines whether a level of the dangerous object and/or dangerous state, which is a level that corresponds to a sensor, is higher than a user damage level and/or a recognition level, at operation 230.

The level of the dangerous object and/or dangerous state is determined at operation 230 to differentiate the level of notifying and warning to a user according from the level of the dangerous object and/or dangerous state.

Namely, the control unit 120 may give an urgent alarm to a user, and/or may switch off the portable terminal, if the level of danger is determined to be relatively high. Alternatively, the control unit 120 may output a notice display in a screen, such as moving images or graphics, an alarm sound, vibration, and a switching on of a light, if the level of danger is relatively low, if the user may recognize a danger.

For example, if an approach of a person and/or object is determined to be closer than a level by analyzing an image obtained from the image sensor 102, the control unit 120 may determine that the person and/or object may inflict an injury to a user due to a higher possibility of collision. If at least one of a movement, collision, and impact generated in the portable terminal is determined to be higher than a level using the motion sensor 104, the control unit 120 may determine that a user may get injured. If a temperature value obtained from the temperature sensor 108 is higher than a value, the control unit 120 may determine that a dangerous object causing a fire and/or explosion is generated and a user may get injured. If an approach of object is determined to be closer than a distance using the proximity sensor 109, the control unit 120 may determine that a dangerous object having a higher possibility of collision with a user is generated. If a pollutant concentration measured by an environment sensor is higher than a value, the control unit 120 determines that the environmental situation is harmful to a user.

According to the determination at operation 230, if the dangerous object and/or dangerous state may inflict an injury to a user and/or is a level unrecognizable by the user, the control unit 120 extracts a control service mapped to the dangerous object and/or the dangerous state at operation 240.

The control service may be at least one of an execution of stopping an application operating in the portable terminal, an execution of switching off a screen, and an execution of outputting an alarm notice sound, and may further utilize any method of awakening a user by attracting attention at the same time of stopping or terminating a previous state of the portable terminal. The control unit 120 executes the extracted control service at operation 250.

Namely, the portable terminal may inform of a dangerous situation to a user by stopping an application operating in the portable terminal, switching off a screen, and/or generating an alarm notice sound.

According to the determination at operation 230, if the dangerous object and/or dangerous state may not inflict an injury to a user and/or is a level recognizable by the user, the control unit 120 extracts a notice service mapped to the dangerous object and/or dangerous state at operation 260.

The notice service is at least one of an execution of outputting metaphors including at least one of a text, a symbol, and an icon for notifying a dangerous state in a screen, an image of dangerous object, a silhouette of dangerous object, an image determined according to the dangerous object, an execution of reducing the brightness of the screen, and an execution of displaying moving image contents to notify of a danger. Further any method of notifying of a dangerous state in an operating state of the portable terminal may be applicable. The metaphor may be output to an application execution screen or a waiting screen, and may be controlled according to settings of the size and transparency of the metaphor. The control unit 120 executes the extracted notice service at operation 270.

Namely, control unit 120 may inform a user of a dangerous situation by outputting metaphors including at least one of a text, a symbol, and an icon for notifying a dangerous state in a screen, an image of the dangerous object, a silhouette of the dangerous object, an image determined according to the dangerous object, and by reducing the brightness of the screen.

FIGS. 4, 5, 6, 7, 8, 9, and 10 are screen examples illustrating a service providing method for preventing an accident while using a portable terminal according to an embodiment of the present disclosure.

Referring to FIG. 4, an example of providing a service for preventing an accident is described in a case where a user browses a website using a portable terminal while walking.

While the user is browsing the website by holding a portable terminal with a hand and walking, the control unit 120 obtains an image from the surroundings of the portable terminal using an image sensor, such as the image sensor 102, of a camera installed in the portable terminal as shown in camera recognition screen 410.

The control unit 120 analyzes the obtained image and determines whether the obtained image matches a pre-stored image of a person's face, as shown in camera recognition screen 420. If the obtained image matches the pre-stored image of the person's face, the control unit 120 outputs a smile emoticon, as a metaphor mapped on the person's face, to a browser execution screen, such as browser execution screens 430 and 440. Namely, the smile emoticon is displayed on the browser execution screen by overlapping.

If the person detected by the image sensor approaches closer to the user, a face recognition area becomes larger, as shown in the camera recognition screen 410 as compared to the camera recognition screen 420, and accordingly the metaphor on the screen of the portable terminal becomes larger, as shown in the browser execution screen 430 as compared to the browser execution screen 440. In the meantime, an opacity, or in other words, transparency, of the metaphor increases, and the user is limited in watching the browser screen according to the distance to the approaching person, as shown in the browser execution screen 430 as compared to the browser execution screen 440. Therefore, the user may intuitively recognize that a person possibly causing a collision is approaching.

Figure 5:
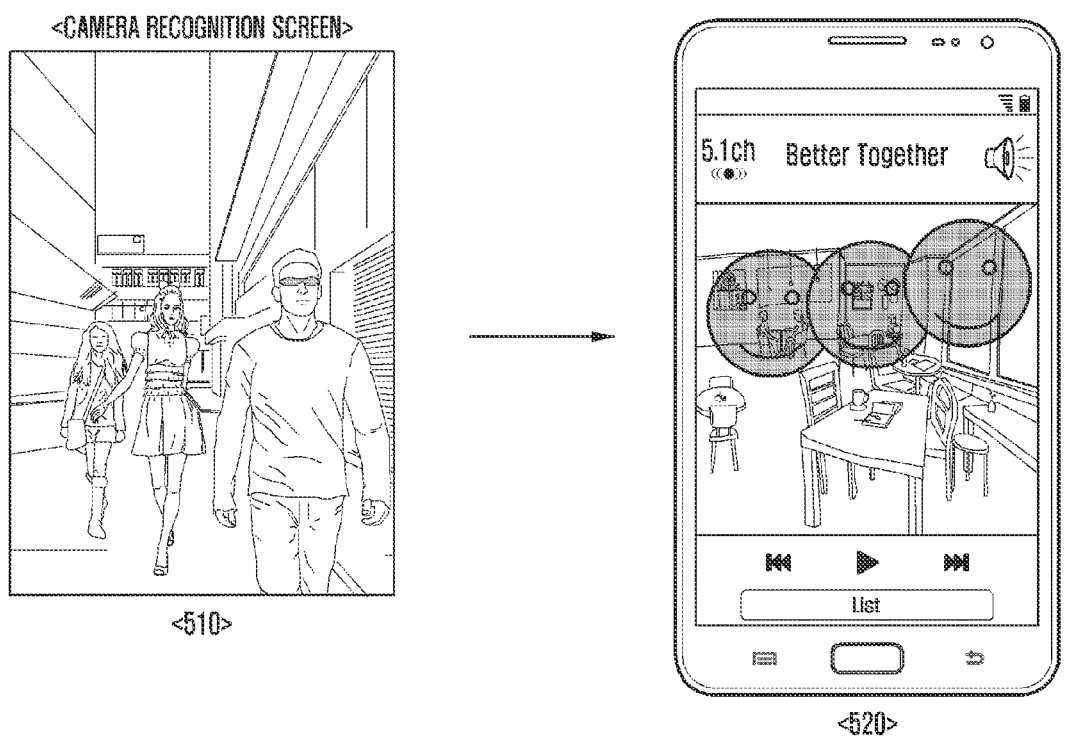
Figure 6:
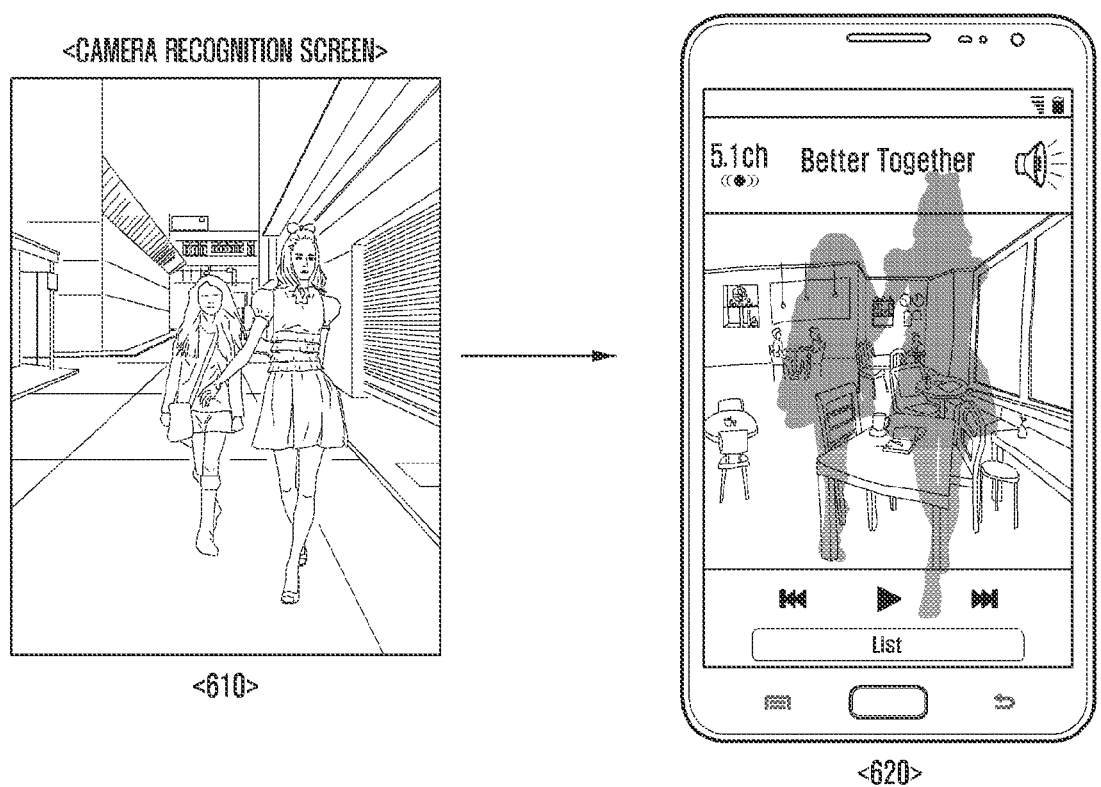

Referring to FIGS. 5 and 6, an example of providing a service for preventing an accident is described in a case where a user browses a website using a portable terminal while walking and there are many persons in front of the user while walking.

Referring to FIG. 5, while the user is browsing the website by holding a portable terminal with a hand and walking, the control unit 120 obtains an image from the surroundings of the portable terminal using an image sensor, such as the image sensor 102, of a camera installed in the portable terminal.

The control unit 120 analyzes the obtained image and determines whether the obtained image matches at least one of a plurality of pre-stored image of persons' faces, as shown in camera recognition screen 510. If the obtained image matches the at least one of the plurality of pre-stored images of persons' faces, the control unit 120 outputs a plurality of smile emoticons as metaphors mapped on respective ones of the plurality of persons' faces to a browser execution screen 520.

Namely, as shown by the browser execution screen 520, the control unit 120 displays the plurality of smile emoticons on the browser execution screen 520 by overlapping the smile emoticons with the image of persons' faces detected in front of the portable terminal. Here, images of persons' faces that are more closely approaching the portable terminal are displayed in a larger size.

If there are more persons in front of the portable terminal, the possibility of collision becomes higher than a case of one person. Accordingly, more metaphors for recognized face images are displayed, a covering area of the screen becomes larger, and the user is limited in watching the web browser screen. Further, the opacity of the metaphor increases, or in other words, the transparency of the metaphor decreases, according to a shortening of the distance to the approaching face, and the user is more limited in watching the screen. Therefore, the user may intuitively recognize that a plurality of persons possibly causing a collision is approaching.

As shown in FIG. 6, the control unit 120 may output silhouettes of persons, as shown in a screen 620, as metaphors corresponding to the persons detected in a camera recognition screen 610. Further, a size and a brightness of the silhouette may be differentiated according to a distance to the approaching person.

If an object and/or animal are detected besides a person, the control unit 120 may display a silhouette of the object and/or animal in the screen of the portable terminal by detecting the boundary of the object using an image recognition technology. In this case, the user may intuitively recognize the existence of object at the front only by seeing the silhouette regardless of the types of objects.

Figure 7:
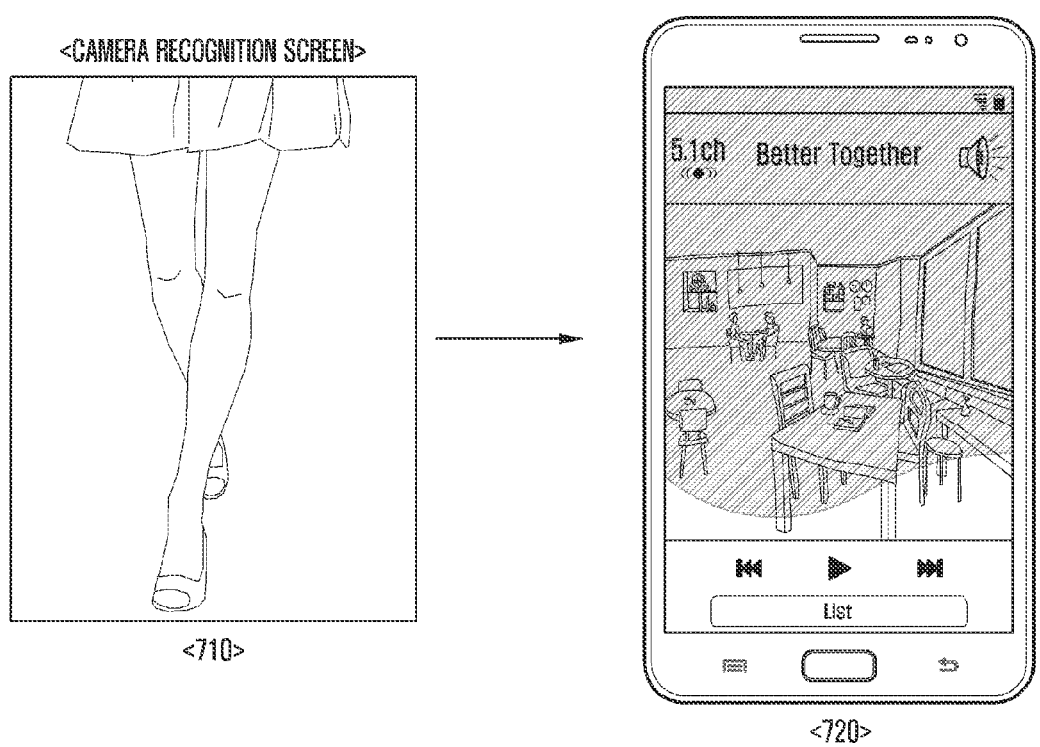

Referring to FIG. 7, another example of providing a service for preventing an accident is described in a case where a user is facing down while walking and using a portable terminal.

Portable terminal users may walk while facing downwards, such as when walking and looking at a screen displayed on the portable terminal. In this case, it is not easy to recognize a face of person standing at the front of the portable terminal by using a camera installed in the portable terminal. Accordingly, the control unit 120 may detect a portion of body beside a person's face and/or an object using an image recognition technology. For example, if legs of a person are detected, as shown in a camera recognition screen 710 of FIG. 7, the control unit 120 may inform and/or provide notification to the user to recognize a danger situation by covering the application execution screen and/or waiting screen, as shown in a screen 720.

Referring to FIG. 8, an example of providing a service for preventing an accident is described in a case where a user is using a portable terminal while walking and the speed and direction of a moving person and/or object are different.

While walking in the street, a person approaching a user has a high possibility of collision with the user than a person walking in the same direction as the user. However, the person walking in the same direction as the user may also have a high possibility of collision with the user, if the person stops suddenly and/or the user walks faster than the person.

Accordingly, the control unit 120 may display a danger sign in a different way by determining the possibility of collision according to at least one of the speed and direction of a moving person in the area surrounding the portable terminal. Namely, the control unit 120 may display a danger notice according to an approaching person, a receding person, an approaching speed, and a receding speed.

Referring to FIG. 8, while the user is walking in the street by watching a screen of the portable terminal, the control unit 120 controls to display redder, or any other similar color, and larger emoticons in an application execution screen 820 if persons are approaching the user, as shown in camera recognition screen 810, and/or persons are walking slower but in the same direction as the user. The control unit 120 displays paler, or in other words, less red, and smaller emoticons in the application execution screen 820 if the persons walk faster than the user but in the same direction as the user.

Accordingly, the user may recognize a person having a possibility of collision and prepare to avoid the collision, even though the user is immersed in the baseball game.

Figure 9:
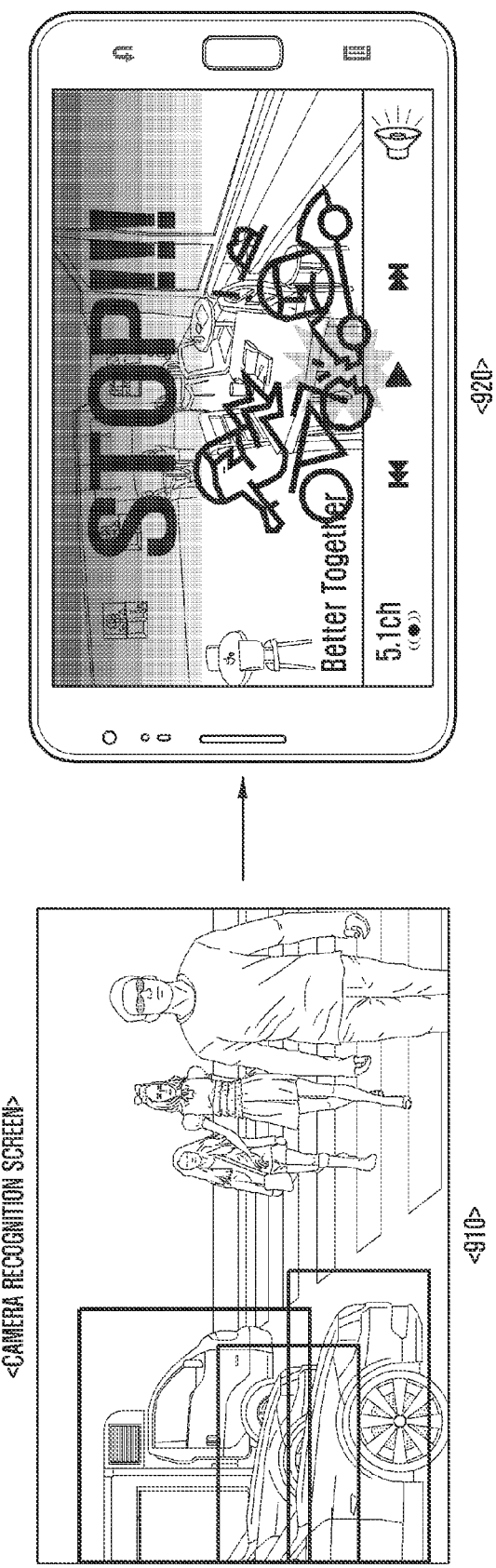

Referring to FIG. 9, an example of providing a service for preventing a collision with a car and/or bicycle is described in a case where a user is using a portable terminal while walking or riding a bicycle.

In a case where a user is watching a baseball game using the portable terminal and riding a bicycle, the control unit 120 may collect a sound generated in the surroundings of the portable terminal, the surroundings of the portable terminal being shown in camera recognition screen 910, by using a sound detection sensor, such as the sound detector 106, installed in the portable terminal.

The control unit 120 analyzes the collected sound and determines whether the collected sound matches a pre-stored sound. If the collected sound matches the pre-stored sound, the control unit 120 outputs a danger notice moving image in an application execution screen 920 as a metaphor mapped on the sound.

Here, the sound may be a horn of a transportation means including a car, a bicycle, a train, a subway train, and an ambulance. The danger notice may be a moving image contents including a text such as "STOP", an image of the user's riding figure, and an image of an object corresponding to the detected sound.

As shown in the application execution screen 920, a moving image contents showing a collision between the user's bicycle and a car may be output on an image in the application execution screen 920. The moving image contents may partially or fully cover the image in the application execution screen 920. Further, a sound output to a speaker, an earphone, or a headset related to image in the application execution screen 920 may be stopped at the same time of displaying the danger notice. Further, another alarm sound or a specific sound detected by the sound detection sensor may be stored, and output to the speaker, the earphone, and/or the headset.

Further, as a notice service for informing a danger to a user, the control unit 120 may vibrate an additional accessory, output a sound through the additional accessory, turn on a light of the portable terminal, and/or output a signal to a wearable device such as a watch, eye glasses, and clothes.

Further, the control unit 120 may adjust an angle of a camera lens to get an optimum searching area by detecting a location and direction of the portable terminal held by the user using a motion sensor and may detect an object located in front of the portable terminal using an image sensor, such as the image sensor 102. Accordingly, a shortcoming of missing a dangerous object according to the user's posture of holding the portable terminal may be remedied. Further, the control unit 120 may detect a wider environmental situation in any case by adjusting a magnification of the camera lens to a wide angle.

Referring to FIG. 10, if an object possibly causing a collision exists in front of the portable terminal, the control unit 120 may control to display an image and/or animation to inform the user with a location of the object possibly causing the collision.

For example, if the object possibly causing the collision is determined to be located at an upper side of the portable terminal, the control unit 120 may display an arrow mark pointing towards an upward direction, as shown by an application execution screen 1010. If the object possibly causing a collision is determined to move from a left side to a right side of the portable terminal, the control unit 120 may display an arrow mark pointing towards a right direction, as shown by application execution screen 1020. Additionally, the control unit 120 may control the arrow mark to gradually cover the screen in a sliding manner according to a movement of the object possibly causing a collision.

The portable terminal according to an embodiment of the present disclosure may prevent an accident by obtaining environmental situation information using at least one sensor, determining a dangerous object and/or a dangerous state by analyzing the environmental situation information, and notifying a user of the dangerous object and/or dangerous state.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for preventing an accident in a portable terminal, the method comprising:
   obtaining environmental situation information from a sensor;
   detecting a dangerous object by analyzing the environmental situation information;
   identifying a danger level of the detected dangerous object;
   extracting a first service mapped to the dangerous object if the danger level is lower than a predetermined level;
   extracting a second service mapped to the dangerous object if the danger level is higher than the predetermined level; and
   executing the at least one of the extracted first service and the extracted second service.

2. The method of claim 1,
   wherein the first service mapped to the dangerous object is extracted from a notice service database storing information on mapping of at least one notice service to at least one dangerous object, and
   wherein the second service mapped to the dangerous object is extracted from a control service database storing information on mapping of at least one control service to at least one dangerous object.

3. The method of claim 1, wherein the obtaining of the environmental situation information using the sensor includes at least one of:
   obtaining an image of an environmental situation using an image sensor,
   detecting a sound of the environmental situation using a voice input unit,
   detecting a motion of the portable terminal using a sensor, detecting a temperature of the environmental situation using a temperature sensor,
detecting an approaching object using a proximity sensor, and
detecting a noxious substance of the environmental situation using an environmental sensor.

4. The method of claim 3, wherein the detecting of the approaching object further comprises determining whether stored environmental situation information matching the obtained environmental situation information exists.

5. The method of claim 3, wherein the stored environmental situation information is stored in an environmental situation information database.

6. The method of claim 1, wherein the detecting of the dangerous object by analyzing an environmental situation information is at least one of:
detecting a dangerous object by detecting at least one of a person and an object through an analysis of an image obtained from an image sensor and determining an approach of the at least one of the person and the object,
detecting the dangerous object by analyzing a sound obtained from a sound detection sensor,
detecting dangerous states of an impact, a collision, and a drop of the portable terminal by analyzing a movement of the portable terminal obtained from a motion sensor,
detecting a dangerous state of surroundings of the portable terminal by analyzing a temperature value obtained from a temperature sensor,
detecting an approach of the at least one of the person and the object in the surroundings of the portable terminal if the approach of the at least one of the person and the object is detected through a proximity sensor, and
detecting a noxious substance in the surroundings of the portable terminal if a noxiousness is detected by an environmental sensor.

7. The method of claim 1, further comprising:
wherein the first service is a notice service comprising displaying an object corresponding to the dangerous object together with a screen of an application being extracted; and
wherein the second service is a control service comprising turning off a display unit.

8. The method of claim 7, wherein the determining of the danger level of the detected dangerous object comprises determining that at least one of:
the environmental situation may inflict an injury on a user if an approach of at least one of a person and an object is identified to be higher than another level by analyzing an image obtained from an image sensor,
the environmental situation may inflict an injury on the user if at least one of a movement, an impact, and a collision of the portable terminal detected by a motion sensor is identified to be higher than yet another level,
the environmental situation may inflict an injury on the user if a temperature value detected by a temperature sensor is identified to be higher than a temperature value,
the dangerous object having a higher possibility of colliding with the user approaches the user if the dangerous object detected by a proximity sensor is closer than a distance value, and
the environmental situation may inflict an injury to the user if a noxiousness detected by an environmental sensor is higher than a noxiousness value.

9. The method of claim 7, wherein the control service is at least one of:
an execution of stopping an application operating in the portable terminal,
an execution of terminating the application,
an execution of partially or fully covering the screen, and
an execution of providing an alarm notice sound.

10. The method of claim 7, wherein the notice service is at least one of:
an execution of outputting metaphors including at least one of a text, a symbol, and an icon for notifying a dangerous state in a screen, image contents corresponding to the dangerous object, a silhouette corresponding to the dangerous object, and at least one of an image and a moving image contents corresponding to the dangerous object while operating an application in the portable terminal,
an execution of reducing a brightness of the screen,
an execution of outputting a separate warning sound through at least one of a speaker, an earphone, and a headset,
an execution of vibrating an additional accessory,
an execution of turning on a light provided in the portable terminal, and
an execution of transmitting a danger signal to a wearable device connected with the portable terminal through at least one of a wireless communication unit and wired communication unit.

11. An apparatus for preventing an accident in a portable terminal, the apparatus comprising:
a sensor unit configured to obtain environmental situation information of the portable terminal;
a control unit configured to:
detect a dangerous object by analyzing the environmental situation information obtained from the sensor unit,
extract a first service mapped to the dangerous object if the danger level is lower than a predetermined level;
extract a second service mapped to the dangerous object if the danger level is higher than the predetermined level, and
execute the at least one of the extracted first service and the control extracted second service; and
a storage unit configured to store environmental situation information for comparing with the at least one of the extracted first service and the extracted second service.

12. The apparatus of claim 11,
wherein the storage unit is configured to store a first service database storing information on mapping of at least one first service to at least one dangerous object,
wherein the storage unit is configured to store a second service database storing information on mapping of at least one second service to at least one dangerous object, and
wherein the storage unit is configured to store environmental situation information in an environmental situation information database.

13. The apparatus of claim 11, further comprising at least one of a speaker, a headset, and an earphone,
wherein the at least one of the speaker, the headset, and the earphone are configured to output an alarm notice sound according to the at least one of the first service and the second service.

14. The apparatus of claim 11, further comprising an additional accessory configured to:
be connectable to the portable terminal through at least one of a wireless communication unit and a wired communication unit, and
execute at least one of outputting a vibration and outputting a sound according to the at least one of the first service and the second service.

15. The apparatus of claim 11, further comprising a wearable device configured to:
- be connectable to the portable terminal through at least one of a wireless communication unit and a wired communication unit, and
- receive a danger signal according to the at least one of the first service and the second service,
- wherein the wearable device is configured to include at least one of:
  - eyeglasses,
  - a watch,
  - clothes, and
  - an object that may be disposed on a body of a user of the portable terminal.

16. The apparatus of claim 11, further comprising a wireless communication unit configured to automatically transmit information of the dangerous object determined by the control unit to a predetermined contact number,
- wherein the contact number is at least one of a telephone number of a family member and a friend determined by at least one of a designer and a user, and telephone numbers of at least one of a fire station, a police station, and a police box.

17. The apparatus of claim 11, wherein the second service is at least one of:
- an execution of stopping an application operating in the portable terminal,
- an execution of terminating the application,
- an execution of partially or fully covering the screen, and
- an execution of providing an alarm notice sound.

18. The apparatus of claim 11, wherein the first service is at least one of:
- an execution of outputting metaphors including at least one of a text, a symbol, and an icon for notifying a dangerous state in a screen, image contents corresponding to the dangerous object, a silhouette corresponding to the dangerous object, and at least one of an image and a moving image contents corresponding to the dangerous object while operating an application in the portable terminal,
- an execution of reducing a brightness of the screen,
- an execution of outputting a separate warning sound through at least one of a speaker, an earphone, and a headset,
- an execution of vibrating an additional accessory,
- an execution of turning on a light provided in the portable terminal, and
- an execution of transmitting a danger signal to a wearable device connected with the portable terminal through at least one of a wireless communication unit and a wired communication unit.

19. The apparatus of claim 11,
- wherein the first service is a notice service comprising displaying an object corresponding to the dangerous object together with a screen of an application being extracted; and
- wherein the second service is a control service comprising turning off a display unit.

* * * * *